United States Patent Office 3,281,449
Patented Oct. 25, 1966

3,281,449
PROCESSES FOR THE PRODUCTION OF NITRILES EMPLOYING LACTONE SOLVENTS
David Jerolamon, Morris Township, Morris County, Fred W. Koff, Clifton, and Robert Fuhrmann, Dover, N.J., assignors to Allied Chemical Corporation, New York, N.Y., a corporation of New York
No Drawing. Continuation of application Ser. No. 148,827, Oct. 31, 1961. This application Apr. 13, 1965, Ser. No. 447,880
5 Claims. (Cl. 260—464)

This application is a continuation of our copending application, Serial No. 148,827, filed October 31, 1961, and now abandoned.

This invention relates to the production of nitriles by cyanidation of an organic halide in a reaction mixture of a metal cyanide and organic halide containing an organic solvent for the metal cyanide, whereby halogen of the organic halide is replaced by the cyano radical. More particularly, the invention is directed to employing a lactone as the solvent present in such reaction mixture.

The cyanidation of organic halides by reaction with a metal cyanide is a well known method of producing nitriles by replacement of one or more of the halogen atoms in the organic halide with the cyano radical. Due to the general insolubility of the metal cyanides in the organic halides, to obtain high yields of the organic cyanide it is usually necessary to have present in the reaction mixture a solvent in which the metal cyanide is soluble. It has heretofore been proposed to employ as such solvents dimethylsulfoxide, aliphatic alcohols or, when appropriate, the previously formed organic nitrile which is the product to be produced by reaction of the organic halide and metal cyanide.

In order to obtain high reaction rates in this cyanidation process it is frequently desirable to operate at temperatures above 100° C. When dimethylsulfoxide is employed as the solvent, however, it decomposes at temperatures above 100° C. When the commonly used lower aliphatic alcohols, for example, ethanol, are employed at elevated temperatures above the boiling point of the alcohol, it is necessary to carry the reaction out in specially constructed pressure resistant vessels. Furthermore, the alcohols generally are not suitable solvents in the cyanidation of the omega-haloalkane carboxylic acid esters. The alcohols enter into an ester interchange reaction with the acid esters.

We have now discovered that lactones of hydroxycarboxylic acids can advantageously be employed as solvent in the reaction mixture in which organic halides are reacted with a metal cyanide. We have found that lactones, unlike dimethylsulfoxide, do not decompose at temperatures above 100° C. It is, therefore, feasible to operate at temperatures as high as about 165° C. By employing lactones having boiling points under atmospheric pressure above the reaction temperature which it is desired to employ, it is unnecessary to provide pressure resistant equipment. Nor do the lactones react with the omega-halo esters at the above temperatures.

In operating in accordance with the processes of our invention a carboxylic acid lactone or a mixture of 2 or more such lactones is present as the solvent in reacting an organic halide with a metal cyanide at temperatures not above about 165° C. to form a nitrile.

Other than the presence of the lactone solvent which characterizes the processes of our invention, the materials employed and process conditions, including the halogenated compounds and the metal cyanides used, the proportions of these reactants, and the amount of solvent present in the reaction mixtures, and the temperatures at which the reaction mixtures are maintained, all can be those known to the art of cyanidation of organic halides.

We prefer to employ the alkali metal or alkaline earth metal cyanides, copper or cadmium cyanide, and to react them with the chlorine or bromine halogenated compounds because these halides are more readily available and cost less. When the chlorides are employed we prefer to maintain reaction temperatures of about 60° to about 165° C. and at temperatures above 100° C. the solvents are particularly beneficial. When the bromides or iodides are employed, temperatures in the range of about 20° to about 165° C. are equally well suited for obtaining a rapid reaction rate.

Preferred ratios of the metal cyanide to the organic halide are from 0.1 to 5 formula wts. of —CN in the metal cyanide for every 1 atomic wt. of that halogen in the organic halide which it is desired to replace by the cyano radical. When a monohalide is used we prefer first to introduce the metal cyanide into and mix it with the solvent, after which the organic halide is introduced. When an organic dihalide is to be converted into the corresponding dinitrile, this same sequence of introducing the metal cyanide into the solvent followed by the organic halide is advantageous. On the other hand, when a mononitrile is to be produced from the organic dihalide, 0.1 to 0.5 formula wts. of —CN in the metal cyanide for every 1 mole wt. of the dihalide are employed, and it is desirable to introduce a solution of the metal cyanide in the solvent gradually into a solution of the dihalide and solvent.

A suitable range in the proportions of lactone solvent to halide is about 0.1 to about 10 parts by weight of the solvent for every 1 part by weight of the halide. Even higher proportions than 10/1 weight parts of the solvent to the halide can be used but to less advantage because of the decreased concentration of the halide in the reaction mixture and its well known effect on the reaction rate.

It is not necessary that all the metal cyanide be in solution in the solvent present in the reaction mixture. The solution of metal cyanide can contain solid cyanide which, as the reaction with the organic halide progresses, goes into solution and reacts with the halide. For example, in the procedure just described for producing a mononitrile from an organic dihalide, solid particulate metal cyanide can be progressively added to the solution of the dihalide in the solvent. The reaction is initiated and progresses in a solution of the metal cyanide in the solvent containing solid metal cyanide dispersed in the solution.

Lactones which can be used as the solvent in the above described processes of our invention include those which are liquid at reaction temperatures and contain up to 12 carbon atoms of which at least 4 carbon atoms are in the heterogeneous, carbon-oxygen ring structure. We preferably use those lactones containing a total of no more than 12 carbon atoms, of which 4 to 8 are in the ring structure and the remainder are in alkyl side chains. Examples of suitable lactones are butyrolactone, valerolactone, omega-caprolactone, gamma dodecanolactone and gamma caprolactone.

The organic halides which can be reacted with an alkali metal cyanide by the processes of our invention to form the corresponding cyano compound in the presence of any one or a mixture of the lactones include, but are not limited to, the saturated and ethylenically unsaturated aliphatic, alicyclic, aromatic and aralkyl mono- and polyhalides and the monohalo and polyhalo esters of the saturated and ethylenically unsaturated aliphatic, carboxylic acid esters, in which ethylenic unsaturation can be in the acid, the alcohol or in both moieties of the ester. Representative examples of these halides include 1-chlorobutane, 1-hexylchloride, the butyl ester of 4-chlorobutanoic acid, 1,4-dichlorobutane, 1,5 - dichloropentane, 1,6 - dichlorohexane, 1,8-dichlorooctane, 1,9-dichlorononane, 1,10-dichlorodecane, 1,4-dichlorobutene-2, n-decyl chloride, n-octyl chloride, allyl chloride, methallyl chloride, cyclopentane chloride, benzyl chloride, 1 chloro-2-nitrobenzene and the corresponding bromides.

The following examples are illustrative of the processes of our invention:

Example 1

Fifteen gms. (0.306 mol wt.) of dry sodium cyanide was introduced into a reaction vessel provided with a thermometer, stirrer, reflux condenser and a tube for introduction of dry nitrogen gas. Butyrolactone (75.0 gms.) was added and the mixture stirred and heated to 120° C. under a nitrogen atmosphere. The butyl ester of 4-chlorobutanoic acid, amounting to 44.6 gms. (0.25 atomic wt. of replaceable chlorine), was then introduced over a 15 minute period and the reaction mixture maintained at 121°–123° C. for a period of 6.5 hours during which the stirring of the reaction mixture under the nitrogen atmosphere was continued. The reaction mixture was then filtered and the filter cake washed with benzene. Analysis of the filter cake for sodium chloride showed 78% of the chloride in the chlorobutanoic acid ester had been replaced by the cyano radical, corresponding to a 78% of theory yield of the butyl ester of 4-cyanobutanoic acid. The combined filtrate and wash liquors were vacuum distilled to remove the benzene and then vacuum distilled to remove the butyrolactone. A pure, chloride-free product was thus recovered in a 73.5% of theory yield based on the butyl ester of 4-chlorobutanoic acid supplied to the reaction mixture. By its infra-red spectrum and vapor chromatography this product was identified as the butyl ester of 4-cyanobutanoic acid.

Example 2

Using the same apparatus as in Example 1, 60 gms. (1.22 mol wt.) sodium cyanide were mixed with 250 cc. butyrolactone and the mixture stirred and heated under a nitrogen atmosphere to 128° C., 112.3 gms. of 1-chlorohexane (0.932 atomic wt. of replaceable chlorine) were added and the mixture maintained at 128° C. for 21 hours. The reaction product was filtered, the filter cake washed with benzene and the combined filtrate and wash liquors distilled as in Example 1. Hexyl cyanide was thus obtained in an 85% of theory yield based on the hexyl chloride consumed. Analysis of the filter cake for chlorine showed 91% of the chlorine in the hexyl chloride replaced by the cyano radical.

Example 3

A suspension of 60 gms. (1.22 moles) of NaCN in 261 gms. omega caprolactone was heated to 105° C. under nitrogen. A total of 92.6 gms. (1 mole) of 1-chlorobutane was added dropwise in 38 minutes so as to maintain the agitated reaction mixture at about that same temperature. After the addition of the chlorobutane was completed the reaction mixture was agitated for an additional 19 hours at the same temperature.

After cooling, the reaction mixture was filtered and the filter cake was washed with two portions of 175 cc. benzene each and then dried. Analysis of a solution of the filter cake in water for ionic chlorine, showed 35.3 gms. NaCl were in the cake, corresponding to 60.5% reaction of the chlorine in the 1-chlorobutane.

The combined benzene washes and the main filtrate were distilled separately and gave 45.7 gms. valeronitrile, which amounts to 55% conversion of the charged halide. No polycaprolactone was found in the reaction mixture by a six-fold dilution with water of an aliquot portion of the reaction mixture filtrate. Only 3% of the caprolactone was polymerized during distillation of this filtrate.

In the foregoing examples an inert gas, nitrogen, was employed as the atmosphere in contact with the reaction mixture in which the organic chloride is reacted with the metal cyanide. This is a conventional use of an inert gas in the cyanidation of an organic halide to prevent discoloration of the nitrile product and oxidation of the cyanide present to cyanate. However, the cyanidation of the organic halide can be carried out employing lactones as the solvent in the reaction mixtures in accordance with our invention, as well as in the previously known processes, without the use of an inert gas provided anhydrous conditions are maintained during the cyanidation of the organic halide.

We claim:

1. In the process in which an organic halide and a metal cyanide are reacted to produce a nitrile, the improvement which comprises conducting the reaction in a solvent essentially consisting of at least one carboxylic acid lactone and maintaining the reaction mixture at a temperature no higher than 165° C., said lactone consisting of hydrogen atoms, two oxygen atoms and up to 12 carbon atoms of which at least 4 carbon atoms are in the lactone ring and being a stable liquid under reaction conditions and nonreactive with omega-haloalkane carboxylic acid esters.

2. The process of claim 1 in which the reaction mixture contains about 0.1 to about 10 parts by weight of said solvent for every one part by weight of the organic halide.

3. The process of claim 1 in which from 0.1 to 5 formula weights of —CN in the metal cyanide is supplied to the reaction mixture for every one atomic weight of that halogen in the organic halide which is to be replaced by the cyano radical to form a nitrile.

4. In the process in which an organic halide and a metal cyanide are reacted to produce a nitrile, the improvement which comprises conducting the reaction in a solvent essentially consisting of at least one lactone of a monohydroxy hydrocarbon carboxylic acid containing a total of no more than 12 carbon atoms of which at least 4 carbon atoms are in the lactone ring structure and the remainder are in alkyl side chains, and which is a stable liquid at reaction conditions, and maintaining the reaction mixture at a temperature above 100° C., but not above 165° C.

5. The process of claim 4 wherein the lactone is selected from the group consisting of butyrolactone and omega caprolactone.

No references cited.

CHARLES B. PARKER, *Primary Examiner.*

JOSEPH P. BRUST, *Examiner.*